United States Patent
Dubey et al.

(10) Patent No.: US 10,627,488 B2
(45) Date of Patent: Apr. 21, 2020

(54) COOLING SENSOR APPARATUS

(71) Applicant: Ford Global Technologies, LLC, Dearborn, MI (US)

(72) Inventors: Prashant Dubey, Canton, MI (US); Segundo Baldovino, Novi, MI (US); Venkatesh Krishnan, Canton, MI (US); Mahmoud Yousef Ghannam, Canton, MI (US); Sami A. Alkharabsheh, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 100 days.

(21) Appl. No.: 16/106,305

(22) Filed: Aug. 21, 2018

(65) Prior Publication Data
US 2020/0064448 A1    Feb. 27, 2020

(51) Int. Cl.
| G01S 7/48 | (2006.01) |
| F28F 7/02 | (2006.01) |
| G01S 7/481 | (2006.01) |
| G01S 17/931 | (2020.01) |

(52) U.S. Cl.
CPC ....... *G01S 7/4813* (2013.01); *F25B 2321/023* (2013.01); *F25B 2321/0251* (2013.01); *F28F 7/02* (2013.01); *F28F 2250/08* (2013.01); *G01S 17/931* (2020.01)

(58) Field of Classification Search
CPC ........ G01S 7/4813; G01S 17/931; F28F 7/02; F28F 2250/08; F25B 2321/023; F25B 2321/0251
USPC ........................................................ 250/239
See application file for complete search history.

(56) References Cited

U.S. PATENT DOCUMENTS

| 4,419,716 A * | 12/1983 | Koo ................ F21V 25/04 362/158 |
| 7,983,041 B2 * | 7/2011 | Godfroy ............. H05K 5/06 165/104.33 |
| 9,749,508 B2 | 8/2017 | Ahn et al. |
| 9,885,526 B2 | 2/2018 | Maranville et al. |
| 2016/0041452 A1 | 2/2016 | Nomura et al. |

FOREIGN PATENT DOCUMENTS

| CN | 206161843 U | 5/2017 |
| DE | 102012011590 B2 | 10/2013 |
| DE | 102014224826 A1 | 6/2016 |

* cited by examiner

*Primary Examiner* — Seung C Sohn
(74) *Attorney, Agent, or Firm* — Frank A. MacKenzie; Bejin Bieneman PLC

(57) ABSTRACT

An apparatus includes a first chamber, a sensor disposed in the first chamber, a second chamber adjacent the first chamber, a filter permitting airflow between the first and second chambers, a chimney connected to the filter and disposed in the second chamber, and a fan positioned to circulate air from the first chamber to the second chamber.

20 Claims, 3 Drawing Sheets ized component from the frame. The body 46 may be formed of any suitable material, for example, steel, aluminum, etc.

COOLING SENSOR APPARATUS

BACKGROUND

A vehicle typically includes sensors. The sensors can provide data about operation of the vehicle, for example, wheel speed, wheel orientation, and engine and transmission data (e.g., temperature, fuel consumption, etc.). The sensors can detect the location and/or orientation of the vehicle. For example, the sensors may be global positioning system (GPS) sensors; accelerometers such as piezo-electric or microelectromechanical systems (MEMS); gyroscopes such as rate, ring laser, or fiber-optic gyroscopes; inertial measurements units (IMU); or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. The sensors can be communications devices, for example, vehicle-to-infrastructure (V2I) or vehicle-to-vehicle (V2V) devices.

DETAILED DESCRIPTION

Figure 1:
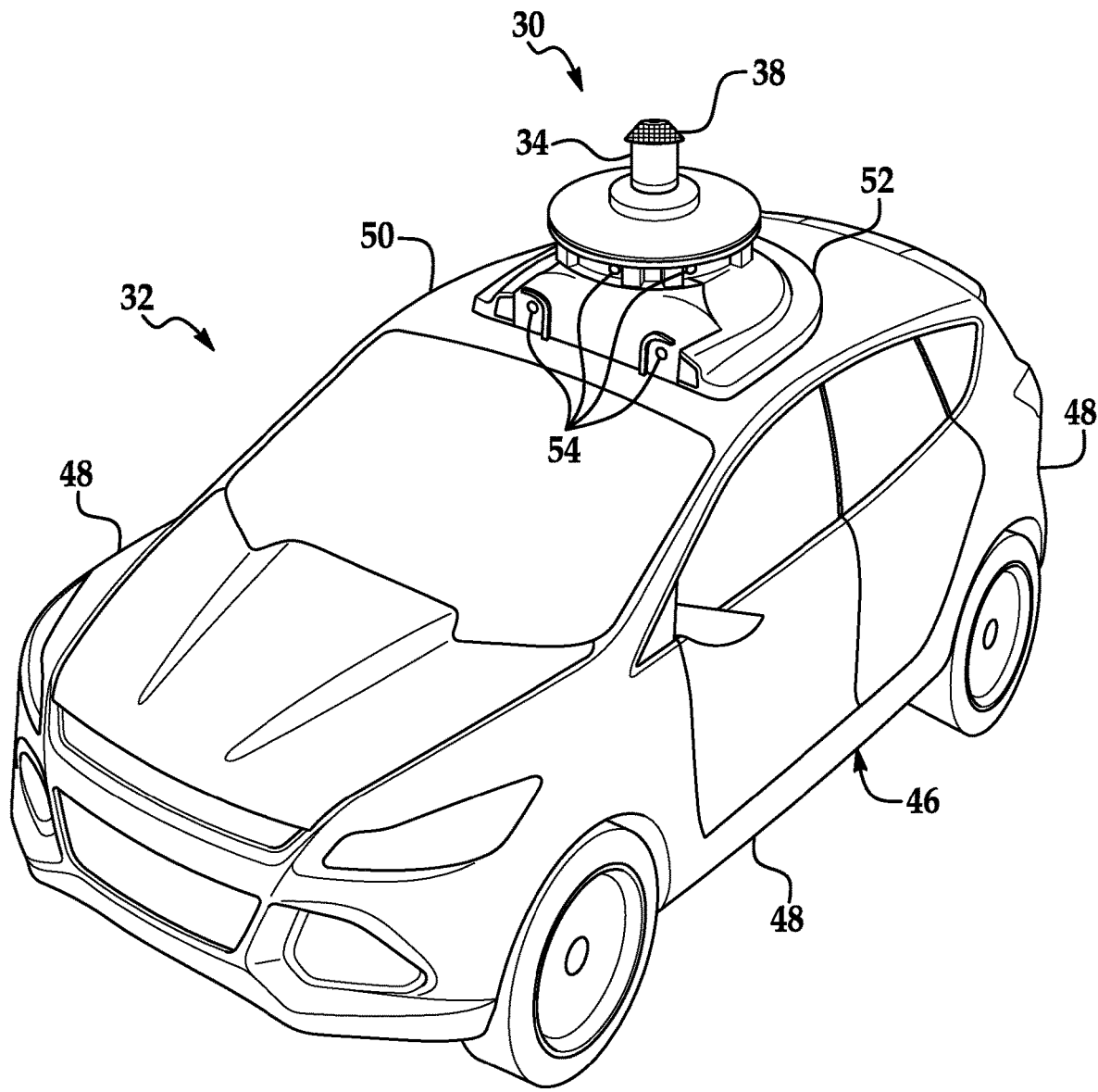
FIG. 1 is a perspective view of an example vehicle.

An apparatus includes a first chamber, a sensor disposed in the first chamber, a second chamber adjacent the first chamber, a filter permitting airflow between the first and second chambers, a chimney connected to the filter and disposed in the second chamber, and a fan positioned to circulate air from the first chamber to the second chamber.

The chimney may include an opening spaced from the filter and spaced from walls of the second chamber.

The chimney may define an axis, and the fan may be disposed in the second chamber on the axis. The fan may be spaced from the chimney.

The second chamber may be sealed from an ambient environment.

The second chamber may be disposed above the first chamber.

The filter may include a microporous semipermeable membrane.

The filter may be a one-way filter oriented to permit airflow from the first chamber to the second chamber.

The filter may be a first filter, and the apparatus may further include a second filter permitting airflow between the first and second chambers. The second filter may be spaced from the chimney.

The fan may be a first fan, and the apparatus may further include a second fan positioned to circulate air from the second chamber to the first chamber. The second fan may be disposed in the second chamber.

The second filter may be ring-shaped and may extend concentrically around the first filter.

The first and second filters may each include a microporous semipermeable membrane.

The first and second filters may be one-way filters, the first filter may be oriented to permit airflow from the first chamber to the second chamber, and the second filter may be oriented to permit airflow from the second chamber to the first chamber.

The second chamber may include an outer wall that is frustum-shaped. The filter may be a first filter, the outer wall may include a lower edge, and the apparatus may further include a second filter extending along the lower edge.

The second chamber may define an axis, and the first chamber may be cylindrical along the axis. The outer wall may include a lower edge, and the diameter of the lower edge may be greater than the diameter of the first chamber.

The apparatus may further include solar cells disposed on an exterior surface of the outer wall, and the solar cells may be electrically connected to the fan.

With reference to the Figures, an apparatus 30 for a vehicle 32 includes a first chamber 34, a first sensor 36 disposed in the first chamber 34, a second chamber 38 adjacent the first chamber 34, a first filter 40 permitting airflow between the first and second chambers 34, 38, a chimney 42 connected to the first filter 40 and disposed in the second chamber 38, and a first fan 44 positioned to circulate air from the first chamber 34 to the second chamber 38.

The apparatus 30 can provide cooling for the first sensor 36, which may be a LIDAR device, by increasing heat transfer from the first sensor 36 to the ambient environment. A LIDAR device can generate 50 watts of heat and is sometimes exposed to prolonged direct sunlight. Excessive heat can degrade performance of a LIDAR device. For example, a LIDAR device can experience performance degradation at above about 65° C. The apparatus 30 can improve performance of the first sensor 36 and reduce possible degradation of the first sensor 36 due to heating. The apparatus 30, as described more fully below, can prevent condensation from reaching the first sensor 36 and can remove moisture from the first chamber 34 housing the first sensor 36.

With reference to FIG. 1, the vehicle 32 may be any passenger or commercial automobile such as a car, a truck, a sport utility vehicle, a crossover, a van, a minivan, a taxi, a bus, etc.

The vehicle 32 may be an autonomous vehicle. A computer can be programmed to operate the vehicle 32 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering without input from a human driver; semi-autonomous operation means the computer controls one or two of the propulsion, brake system, and steering and a human driver controls the remainder; and nonautonomous operation means a human driver controls the propulsion, brake system, and steering. The computer may use data from the first sensor 36 when autonomously or semi-autonomously operating the vehicle 32.

The vehicle 32 includes a body 46. The vehicle 32 may be of a unibody construction, in which a frame and the body 46 of the vehicle 32 are a single component. The vehicle 32 may, alternatively, be of a body-on-frame construction, in which the frame supports the body 46 that is a separate component from the frame. The frame and body 46 may be formed of any suitable material, for example, steel, aluminum, etc. The body 46 includes body panels 48, 50 partially defining an exterior of the vehicle 32. The body panels 48, 50 may present a class-A surface, e.g., a finished surface exposed to view by a customer and free of unaesthetic blemishes and defects. The body panels 48, 50 include, e.g., a roof 50, etc.

A casing 52 for second sensors 54 is attachable to the vehicle 32, e.g., to one of the body panels 48, 50 of the vehicle 32, e.g., the roof 50. For example, the casing 52 may be shaped to be attachable to the roof 50, e.g., may have a shape matching or following a contour of the roof 50 or otherwise facilitating mounting or attachment. The casing 52 may be attached to the roof 50, which can provide the second sensors 54 with an unobstructed field of view of an area around the vehicle 32. The casing 52 may be formed of, e.g., plastic or metal.

Figure 2:
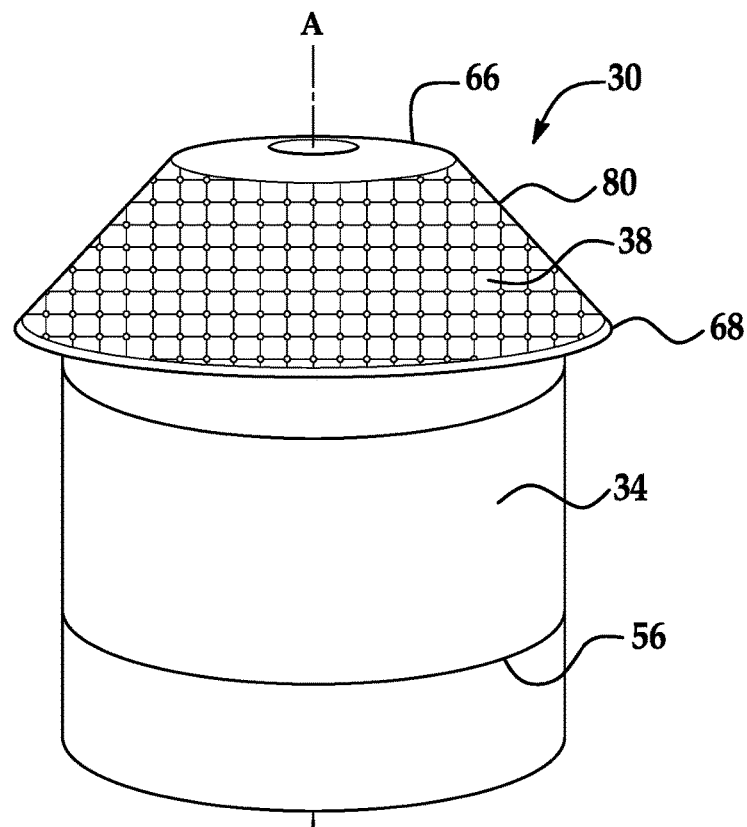
FIG. 2 is a perspective view of a sensor apparatus of the vehicle of FIG. 1.

With reference to FIGS. 1 and 2, the first chamber 34 may be exposed outside the casing 52. The first sensor 36 is disposed in the first chamber 34. The first chamber 34 may be supported by the casing 52. The first chamber 34 may be mounted indirectly to the roof 50 via the casing 52. The first chamber 34 may have a cylindrical shape oriented vertically, i.e., an axis A of the cylindrical shape can be substantially vertical. The first chamber 34 may include a cylindrical sensor window 56 extending about an exterior of the first chamber 34. The sensor window 56 may define the axis A. The first sensor 36 may have a 360° horizontal field of view through the sensor window 56.

Figure 3:
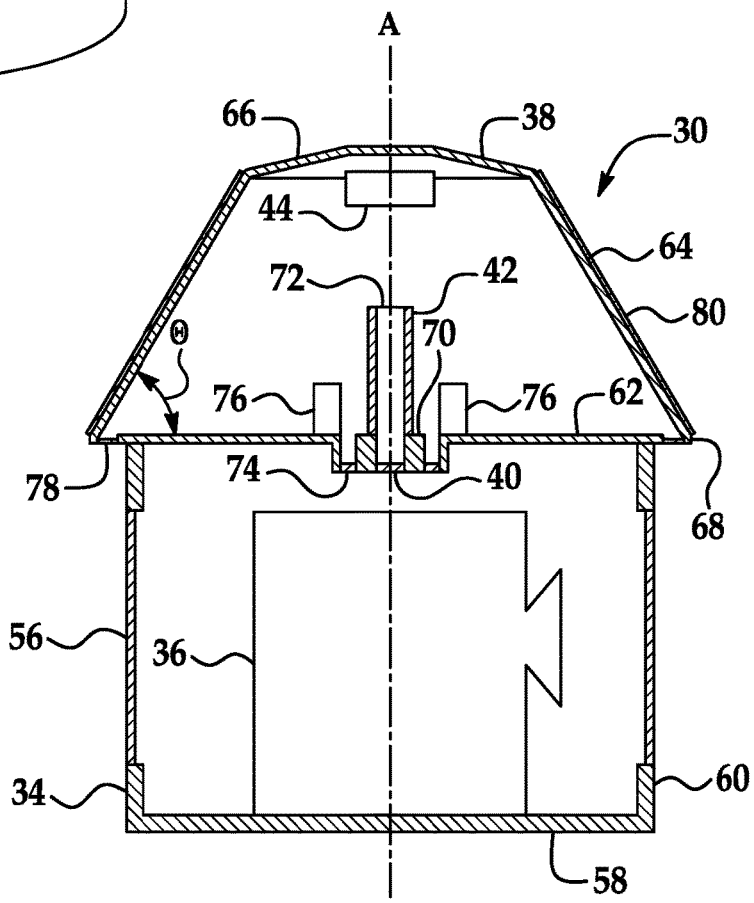
FIG. 3 is a side cross-sectional view of the sensor apparatus of FIG. 2.

With reference to FIG. 3, the first sensor 36 may detect the location and/or orientation of the vehicle 32. For example, the first sensor 36 may be a global positioning system (GPS) sensors; accelerometer such as piezo-electric or microelectromechanical systems (MEMS); gyroscope such as rate, ring laser, or fiber-optic gyroscopes; inertial measurements unit (IMU); or magnetometer. The first sensor 36 may detect the external world, e.g., objects and/or characteristics of surroundings of the vehicle 32, such as other vehicles, road lane markings, traffic lights and/or signs, pedestrians, etc. For example, the first sensor 36 may be a radar sensor, scanning laser range finder, light detection and ranging (LIDAR) device, or image processing sensor such as a camera. In particular, the first sensor 36 may be a LIDAR device. A LIDAR device detects distances to objects by emitting laser pulses and measuring the time of flight for the pulse to travel to the object and back.

The first chamber 34 includes a bottom panel 58, a first outer wall 60, and a shared panel 62. The first outer wall 60 is cylindrical and includes the sensor window 56. The shared panel 62 is included in both the first chamber 34 and the second chamber 38. The shared panel 62 may be two abutting panels, one partially constituting the first chamber 34 and one partially constituting the second chamber 38, or the shared panel 62 may be a single, unitary panel, i.e., formed of a single piece or part, as shown in FIG. 3.

The second chamber 38 is adjacent, i.e., immediately next to or abutting, the first chamber 34. The second chamber 38 may be disposed above the first chamber 34. The second chamber 38 may include the shared panel 62, a second outer wall 64, and a top panel 66. The second chamber 38 may be sealed from an ambient environment, i.e., the shared panel 62, the second outer wall 64, and the top panel 66 may be formed or fitted together so as to prevent debris in the ambient environment from entering the second chamber 38. The second outer wall 64 may be frustum-shaped, i.e., shaped like a portion of a cone remaining after removing a top of the cone using a plane parallel to a base of the cone. The second chamber 38 defines an axis, e.g., the axis A; for example, the second chamber 38 may define a central axis of the frustum shape of the second outer wall 64. The first chamber 34 and the second chamber 38 may be coaxial, i.e., cylindrically shaped and defining the same axis A. The outer wall includes a lower edge 68. The lower edge 68 is the edge that is closer to the first chamber 34 and that has a larger diameter. The diameter of the lower edge 68 is greater than a diameter of the first chamber 34, i.e., a diameter of the first outer wall 60.

Figure 4:
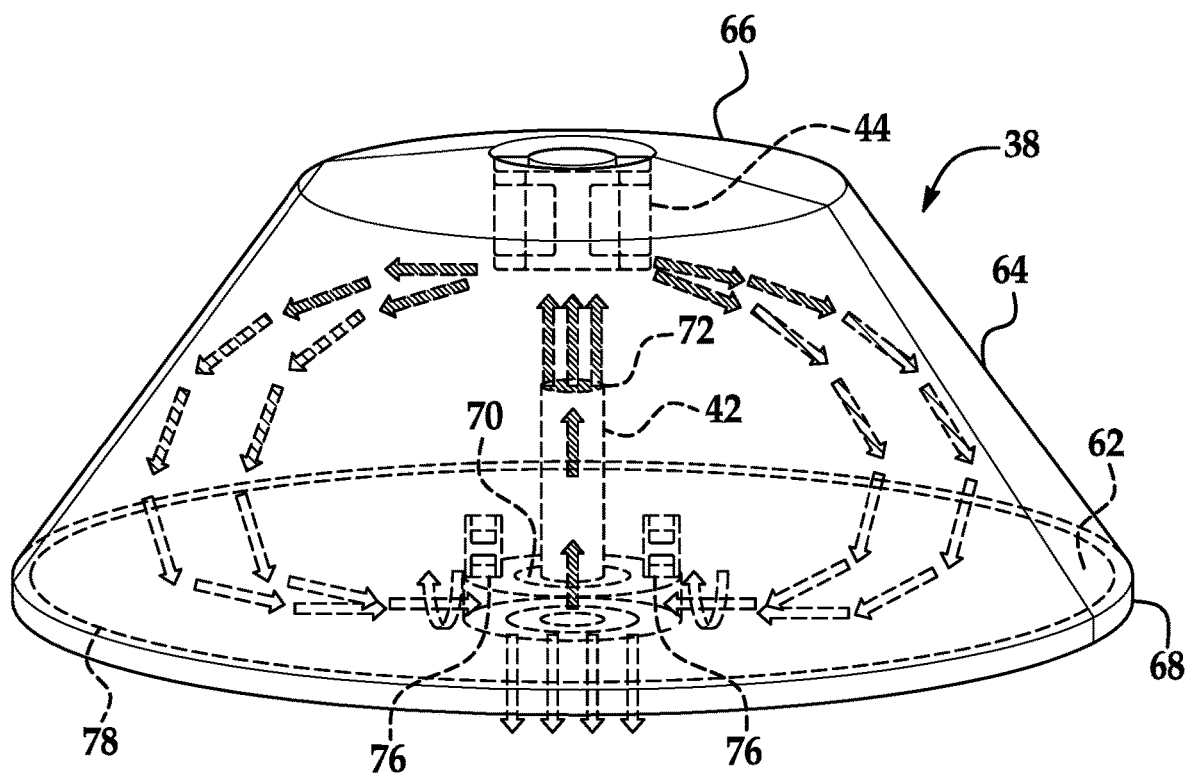
FIG. 4 is a perspective view of a second chamber of the sensor apparatus of FIG. 2.
Figure 5:
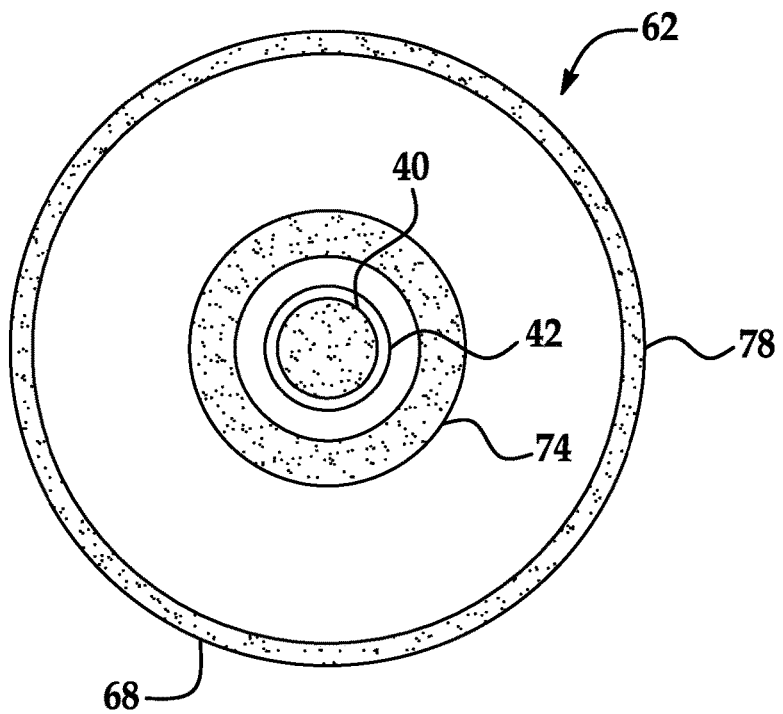
FIG. 5 is a top view of a shared panel of the sensor apparatus.

With reference to FIGS. 3-5, the first filter 40 may be circular and may be positioned concentrically at a middle of the shared panel 62, which may also be circular. The first filter 40 extends through the shared panel 62 and is open to the first chamber 34 and to the second chamber 38.

The first filter 40 permits airflow between the first and second chambers 34, 38. The first filter 40 may be a microporous semipermeable membrane, or a stack of multiple such membranes. The first filter 40 includes micrometer-level pores permitting air and moisture to flow in one direction and blocking air and moisture in an opposite direction. The first filter 40 may be hydrophilic toward the first chamber 34 and hydrophobic or waterproof toward the second chamber 38. The first filter 40 is a one-way filter oriented to permit airflow and moisture flow from the first chamber 34 to the second chamber 38. Alternatively, the first filter 40 may be any suitable type of filter for removing solid particulates such as dust, pollen, mold, dust, and bacteria from air flowing through the filter, e.g., paper, foam, cotton, stainless steel, oil bath, etc.

The chimney 42 is connected to the first filter 40, e.g., fixed to the shared panel 62 concentrically around the first filter 40. The chimney 42 is disposed in the second chamber 38. The chimney 42 has a tubular shape. The chimney 42 may define an axis, e.g., the axis A. The chimney 42 is elongated from a first opening 70 fixed to the shared panel 62 to a free second opening 72. The second opening 72 is spaced from walls of second chamber 38, i.e., in the design shown in the Figures, spaced from the shared panel 62, the second outer wall 64, and the top panel 66. For the purposes of this disclosure, "spaced from" means separated from and not contacting.

A second filter 74 is positioned in the shared panel 62. The second filter 74 extends through the shared panel 62 and is open to the first chamber 34 and to the second chamber 38. The second filter 74 is ring-shaped and extends concentrically around the first filter 40 and around the chimney 42, specifically the first opening 70 of the chimney 42. The second filter 74 is spaced from the chimney 42 and the first filter 40.

The second filter 74 permits airflow between the first and second chambers 34, 38. The second filter 74 may be a microporous semipermeable membrane, or a stack of multiple such membranes. The second filter 74 includes micrometer-level pores permitting air to flow in one direction and blocking air in an opposite direction. The second filter 74 is a one-way filter oriented to permit airflow from the second chamber 38 to the first chamber 34. The second filter 74 may be hydrophobic or waterproof toward both chambers 34, 38. Alternatively, the second filter 74 may be any suitable type of filter for removing solid particulates such as dust, pollen, mold, dust, and bacteria from air flowing through the filter, e.g., paper, foam, cotton, stainless steel, oil bath, etc.

The first fan 44 is positioned to circulate air from the first chamber 34 to the second chamber 38. The first fan 44 may be disposed in the second chamber 38 on the axis A above the chimney 42. The first fan 44 may be spaced from the second opening 72 of the chimney 42. The first fan 44 may be oriented to draw air from the first chamber 34 through the first filter 40 and the chimney 42 and direct that air toward the top panel 66 of the second chamber 38.

Second fans 76 may be positioned to circulate air from the second chamber 38 to the first chamber 34. The second fans 76 may be attached to and positioned on the shared panel 62 radially outward from the second filter 74 relative to the axis A. The second fans 76 may be evenly spaced around the axis A; for example, as shown in the Figures, two second fans 76 may be spaced 180° from each other around the axis A. The second fans 76 may be oriented to draw air radially inward from near the second outer wall 64 along the shared panel 62 and direct that air toward the second filter 74 to the first chamber 34.

A third filter 78 extends along the lower edge 68. The third filter 78 is positioned in the shared panel 62. The third filter 78 extends through the shared panel 62 and is open to the second chamber 38 and to the ambient environment. The third filter 78 is ring-shaped and extends concentrically around the first chamber 34, i.e., the first outer wall 60.

The third filter 78 permits airflow between the second chamber 38 and the ambient environment. The third filter 78 may be a microporous semipermeable membrane, or a stack of multiple such membranes. The third filter 78 includes micrometer-level pores permitting air and moisture to flow in one direction and blocking air and moisture in an opposite direction. The third filter 78 may be hydrophilic toward the second chamber 38 and hydrophobic or waterproof toward the ambient environment. The third filter 78 is a one-way filter oriented to permit airflow and moisture flow from the second chamber 38 to the ambient environment. Alternatively, the third filter 78 may be any suitable type of filter for removing solid particulates such as dust, pollen, mold, dust, and bacteria from air flowing through the filter, e.g., paper, foam, cotton, stainless steel, oil bath, etc.

With reference to FIGS. 2 and 3, a plurality of solar cells 80 are disposed on an exterior surface of the second outer wall 64. The solar cells 80 may be sufficiently flexible to conform to a contour of the second outer wall 64. The solar cells 80 may be, e.g., graphene solar cells. A vertical angle θ of the second outer wall 64, i.e., an angle θ of the second outer wall 64 relative to the axis A, may be chosen to maximize solar energy available to be absorbed by the solar cells 80. The solar cells 80 may be electrically connected to the first fan 44 and to the second fans 76. The first fan 44 and the second fans 76 may also be connected to a power bus (not shown) of the vehicle 32. The solar cells 80 may be equipped to provide a majority of the power demands of the first fan 44 and the second fans 76.

In operation, the first sensor 36 generates heat in the first chamber 34. The first fan 44, as well as natural convection, draws air from the first chamber 34 to the second chamber 38. The air travels vertically through the first filter 40 and the chimney 42 to the top panel 66 and then down along the second outer wall 64 of the second chamber 38. As the air travels along the top panel 66 and second outer wall 64, the air cools by exchanging heat with the ambient environment. The second fans 76 draw the air inward from the second outer wall 64 along the shared panel 62 toward the axis A. The air then passes through the second filter 74 from the second chamber 38 to the first chamber 34, completing the cycle.

Moisture that is in the first chamber 34 is able to pass through the first filter 40 along with the air into the second chamber 38. The moisture may condense on the second outer wall 64, which may be cooler than the air, as the air travels along the second outer wall 64. The condensation may flow down the second outer wall 64 to the third filter 78 and exit the second chamber 38 through the third filter 78. The second filter 74 prevents the moisture from flowing into the first chamber 34. The first chamber 34 can thus be kept dry.

The disclosure has been described in an illustrative manner, and it is to be understood that the terminology which has been used is intended to be in the nature of words of description rather than of limitation. The adjectives "first," "second," "third" are used throughout this document as identifiers and are not intended to signify importance or order. "Substantially" as used herein means that a dimension, time duration, shape, or other adjective may vary slightly from what is described due to physical imperfections, power interruptions, variations in machining or other manufacturing, etc. Many modifications and variations of the present disclosure are possible in light of the above teachings, and the disclosure may be practiced otherwise than as specifically described.

What is claimed is:

1. An apparatus, comprising:
 a first chamber;
 a sensor disposed in the first chamber;
 a second chamber adjacent the first chamber;
 a filter permitting airflow between the first and second chambers;
 a chimney connected to the filter and disposed in the second chamber; and
 a fan positioned to circulate air from the first chamber to the second chamber.

2. The apparatus of claim 1, wherein the chimney includes an opening spaced from the filter and spaced from walls of the second chamber.

3. The apparatus of claim 1, wherein the chimney defines an axis, and the fan is disposed in the second chamber on the axis.

4. The apparatus of claim 3, wherein the fan is spaced from the chimney.

5. The apparatus of claim 1, wherein the second chamber is sealed from an ambient environment.

6. The apparatus of claim 1, wherein the second chamber is disposed above the first chamber.

7. The apparatus of claim 1, wherein the filter includes a microporous semipermeable membrane.

8. The apparatus of claim 1, wherein the filter is a one-way filter oriented to permit airflow from the first chamber to the second chamber.

9. The apparatus of claim 1, wherein the filter is a first filter, the apparatus further comprising a second filter permitting airflow between the first and second chambers.

10. The apparatus of claim 9, wherein the second filter is spaced from the chimney.

11. The apparatus of claim 9, wherein the fan is a first fan, the apparatus further comprising a second fan positioned to circulate air from the second chamber to the first chamber.

12. The apparatus of claim 11, wherein the second fan is disposed in the second chamber.

13. The apparatus of claim 9, wherein the second filter is ring-shaped and extends concentrically around the first filter.

14. The apparatus of claim 9, wherein the first and second filters each include a microporous semipermeable membrane.

15. The apparatus of claim 9, wherein the first and second filters are one-way filters, the first filter is oriented to permit airflow from the first chamber to the second chamber, and the second filter is oriented to permit airflow from the second chamber to the first chamber.

16. The apparatus of claim 1, wherein the second chamber includes an outer wall that is frustum-shaped.

17. The apparatus of claim 16, wherein the filter is a first filter, the outer wall includes a lower edge, and the apparatus further comprises a second filter extending along the lower edge.

18. The apparatus of claim 16, wherein the second chamber defines an axis, and the first chamber is cylindrical along the axis.

19. The apparatus of claim 18, wherein the outer wall includes a lower edge, and the diameter of the lower edge is greater than the diameter of the first chamber.

20. The apparatus of claim 16, further comprising solar cells disposed on an exterior surface of the outer wall, the solar cells electrically connected to the fan.

* * * * *